United States Patent Office 3,056,686
Patented Oct. 2, 1962

3,056,686
PRODUCTION OF REINFORCED ARTICLES
Richard F. Shannon, Lancaster, Ohio, assignor to Owens-Corning Fiberglas Corporation, a corporation of Delaware
No Drawing. Filed Aug. 15, 1956, Ser. No. 604,082
3 Claims. (Cl. 106—85)

This invention relates to the production of reinforced articles, and, more particularly, to the production of such articles comprising flakes or fibers of glass or a similar material and an inorganic binder.

It has heretofore been suggested that various inorganic binders can be employed in the production of articles reinforced with fibers or flakes of glass or other similar material. Most such binders, however, contain a sufficiently high proportion of highly alkaline materials that they attack glass in the form of flakes or fibers and rapidly destroy the efficacy thereof as reinforcements. As specific examples, alkali gypsum, Portland cement and sodium silicate are all so highly alkaline that they will actually dissolve glass flakes or glass fibers used in conjunction therewith as reinforcing constituents. After a few months an article comprising glass fibers or flakes and any of these materials as an inorganic binder will be found to be composed essentially of the binder, without any reinforcement.

As a result of the phenomenon discussed in the preceding paragraph there remains a substantial need for an inorganic binder, capable of resisting temperatures beyond the range of organic binders which have been used satisfactorily with flake or fiber reinforcement of glass or other similar material. The available inorganic binders that have the necessary temperature resistance cannot be used because of their attack on the glass.

The present invention is based upon the discovery that various inorganic binders can be reconstituted, by chemical reaction, to a form in which they do not attack glass or similar materials in the form of flakes or fibers, and that articles having properties such as high temperature resistance not heretofore available in glass reinforced materials can be produced from such reconstituted inorganic binders and glass flake or fiber reinforcement.

It is, therefore, an object of the invention to provide an improved composition of matter comprising an inorganic binder, and, as a reinforcing medium, flakes or fibers of glass or other similar material.

It is another object of the invention to provide an improved method for producing articles reinforced with glass or other similar material, using an inorganic binder.

Other objects and advantages will be apparent from the description which follows, which is intended only to illustrate and disclose, but in no way to limit, the invention.

According to the invention an article comprising a mass of glass or similar reinforcement, in a physical form having a high ratio of surface to weight, i.e., in the form of flakes or fibers, and an inorganic binder is provided. Such method includes the steps of impregnating the glass or similar reinforcement with an inorganic binder which includes at least one alkali metal compound having a pH greater than 10.5 and with a substance which is reactive with the alkali metal compound to produce an inorganic binder constituent and a second compound, both of which have a pH not greater than 10.5, and hardening the inorganic binder. It is preferred that the substance which reacts with the alkali metal compound be used in an amount at least sufficient for substantially complete reaction with the alkali metal compound.

Sodium silicate, Portland cement and alkali gypsum are all examples of inorganic binders which include at least one alkali metal compound having a pH greater than 10.5. These materials are, therefore, unsuited per se for use in conjunction with glass flake or fiber reinforcement. Magnesium chloride is an example of a substance which is reactive with sodium silicate to produce an inorganic binder constituent and a second compound, both of which have a pH not greater than 10.5. Magnesium chloride is capable of reaction with sodium silicate to produce magnesium silicate and sodium chloride, both of which have the indicated pH, and neither of which is seriously detrimental to glass in flake or fibrous form. In one specific embodiment, therefore, the invention contemplates reaction between sodium silicate and magnesium chloride to produce magnesium silicate as a binder, and sodium chloride as an inert by-product. The chemical reactions involved can advantageously be carried out by impregnating a glass reinforcing medium, such as a mass of flakes or fibers, with magnesium chloride or other similar material, and then with sodium silicate.

As is indicated above, it is preferred that the amount of magnesium chloride or other material employed be at least sufficient for substantially complete reaction with the sodium silicate or other binder; for optimum results an excess of the magnesium chloride or other equivalent material should be employed. It is known that alkali metal oxides tend to leach from glass flakes and fibers during ordinary aging thereof, and that the leached oxides deteriorate the glass from which they were leached. By using an excess of magnesium chloride or other similar material it is possible to provide in the binder composition what might be denominated a "buffer," which is available to counteract the harmful effect of such leached alkali. In the case of $MgCl_2$ the "buffering" reaction would involve the production of $NaCl$ and $MgO$ or $MgOH$.

Various ion exchange materials, natural and synthetic, can also be employed in place of magnesium chloride as the substance which is reactive with the alkali metal compound. When used, the ion exchange material can be either in the acid regenerated form or in the metal salt regenerated form, depending upon the result desired. As examples of naturally occurring ion exchange materials that can be employed, mention can be made of the zeolites and of sulphonated coals. When reconstituted binders for use at relatively low temperatures are desired, best results can usually be obtained with the relatively more efficient, or higher capacity, synthetic cation exchange resins which have recently been developed, for example of the type of sulphonated polymerizates of mixtures comprising a polyvinyl aryl compound and a monovinyl aryl compound, suggested in U.S. Patent 2,366,007. Inorganic binders, however, are usually of particular advantage where they are intended for the production of materials resistant to relatively high temperatures. The synthetic organic ion exchange materials undergo pyrolysis at temperatures substantially below the limits of many inorganic binders. Particularly the zeolite type of ion exchange material retains its effectiveness at temperatures substantially above the pyrolysis temperatures of most organic ion exchangers. When, therefore, as is usually the case, it is desired that the ion exchange material not only reconstitute the inorganic binder, but also that it act as a buffer to counteract the effect of alkali leached from the glass during aging, the zeolites are preferred ion exchange materials if a high temperature product is desired.

When ion exchange materials are used in the metal salt regenerated form, a binder such as sodium silicate can be reconstituted in generally the same manner as when magnesium chloride is employed for this purpose, as described above. For example, such a cation exchange material as that which is commercially available under the trade designation "Amberlite IR-120" (a sulphonated polymerizate of a polyvinyl aryl compound and a monovinyl aryl compound) can be regenerated with an aqueous solution of magnesium chloride, and the regenerated resin then used to reconstitute the sodium silicate by admixture therewith. The reactions involved in reconstitution of the sodium silicate are a conversion of the sodium silicate to magnesium silicate and a conversion of the cation exchange material from the magnesium salt form to the sodium salt form. The sodium in the salt form of the exchange material is tightly bonded, or effectively sequestered from the other ingredients of the binder composition, and is incapable of deteriorating the surfaces of glass flakes or fibers used for reinforcement.

When ion exchange materials are used in the acid regenerated form, a binder such as sodium silicate can be reconstituted as silicic acid. The reactions involved in reconstitution of the sodium silicate are a conversion of the sodium silicate to silicic acid and a conversion of the cation exchange material from the acid form to the sodium salt form.

As in the case where magnesium chloride or other equivalent salt is employed to reconstitute an inorganic binder, the amount of a cation exchange material employed should be at least sufficient for substantially complete reaction with all the cations in the binder that form hydroxides, carbonates or silicates having a pH higher than 10.5, and most desirably an excess of the cation exchange material is used. The amount of any given cation exchange material required for substantially complete reaction with such cations in a particular binder composition can be determined experimentally, for example, by means of a pH titration of the regenerated exchange material with the binder composition. As a specific example of such a pH titration, a known weight of the regenerated exchange material can be placed in a beaker or flask with several volumes of boiled distilled water per volume of the exchange material, and pH readings taken initially and after each of successive small additions of the binder composition. In the case of the titration of the exchange material available under the designation "Amberlite IR-120" with sodium silicate a plot of pH verses ccs. of sodium silicate added will have generally the shape of the titration curve of a strong acid with a strong base, and the known amount of the cation exchange material initially weighed into the beaker or flask will be the amount of such material required for substantially complete reaction with the cations in the number of ccs. of sodium silicate required, during the titration, to take the pH to 7.0. As is stated above, at least this amount of the cation exchange material should be employed, and, preferably, an excess thereof is used. For optimum results, the amount of an ion exchange material or other substance employed to reconstitute an inorganic binder in accoroance with the invention should be from 1.1 to 1.7 times the amount thereof required for complete reaction with the alkaline constituents of the binder composition.

Magnesium chloride and various cation exchange materials have been discussed specifically as substances which are reactive, and can be used in reconstituting an inorganic binder in accordance with the invention. Various other materials can be used in a similar manner. In general, in addition to being reactive with the constituents responsible for the undesirably high alkalinity of the inorganic binder, such substances must produce, during the course of the reconstituting reaction, no material having a pH higher than about 10.5. For example, magnesium oxide is capable of reaction with sodium silicate to produce magnesium silicate, and is, to that extent, an equivalent for magnesium chloride. However, magnesium oxide cannot be used to produce a binder in accordance with the invention, because the by-product of such reaction is sodium hydroxide, which would deteriorate, and eventually destroy, glass flakes or fibers used as reinforcement with the binder. In general, the substance used to reconstitute an inorganic binder in accordance with the invention can, therefore, be an ion exchange material in the acid regenerated or metal salt regenerated condition or can be a metal salt, provided that the salt is of a metal which forms hydroxides, carbonates and silicates all of which have a pH not greater than 10.5. Magnesium chloride is a specific example of such a salt, and can be used alone, or with an ion-exchange material. It is preferred that such salt, when used, be one of a strong acid, most desirably of a strong mineral acid.

It will be apparent that various changes and modifications can be made from the specific details discussed herein without departing from the spirit and scope of the attached claims.

What I claim is:

1. A composition of matter consisting essentially of a mass of glass reinforcement in a physical form having a high ratio of surface to weight and, as a <u>binder</u>, an inorganic silicate which is substantially free of any ingredient having a pH greater than 10.5, which is selected from the group consisting of silicic acid and alkaline earth metal silicates, and which contains alkali metal cations in the form of their product of reaction with an ion exchange material selected from the group consisting of zeolites, sulphonated coals, and sulphonated polymerizates of mixtures comprising a polyvinyl aryl compound and a monovinyl aryl compound.

2. A composition of matter as claimed in claim 1 wherein said binder is silicic acid.

3. A composition of matter as claimed in claim 1 wherein said binder is an alkaline earth metal silicate.

References Cited in the file of this patent

UNITED STATES PATENTS

| | | |
|---|---|---|
| 2,245,783 | Hyde | June 17, 1941 |
| 2,292,199 | Carter | Aug. 4, 1942 |
| 2,425,883 | Jackson | Aug. 19, 1947 |
| 2,481,391 | Campbell | Sept. 6, 1949 |
| 2,738,285 | Biefield | Mar. 13, 1956 |

FOREIGN PATENTS

| | | |
|---|---|---|
| 3,393 | Great Britain | Aug. 20, 1880 |
| 25,861 | Great Britain | of 1897 |
| 209,106 | Great Britain | Aug. 21, 1924 |